Patented Oct. 10, 1950

2,525,514

UNITED STATES PATENT OFFICE 2,525,514

PARTIALLY DE-ETHERIFIED CELLULOSE CYANOETHYL ETHERS AND THEIR PREPARATION

Kenneth T. Barkey and John W. Mench, Rochester, N. Y., assignors to Eastman Kodak Company, Rochester, N. Y., a corporation of New Jersey No Drawing. Application January 21, 1948, Serial No. 3,554

4 Claims. (Cl. 260—232)

This invention relates to cellulose cyanoethyl ethers which have been made water susceptible by partially de-etherifying them and their preparation by subjecting solutions of cellulose cyanoethyl ethers to treatment with aqueous alkalies under substantially maximum solubility conditions.

Cellulose cyanoethyl ethers have previously been prepared in the prior art by reacting cellulose with a large excess of acrylonitrile under alkaline conditions at an elevated temperature. The thus-formed material is precipitated out by means of water or aqueous alcohol and is soluble in various organic solvents but insoluble in water or solvents containing any substantial proportion of water.

It is an object of our invention to provide cellulose cyanoethyl ethers which are soluble in solvents containing a substantial proportion of water or, in some cases, consisting entirely of water. Another object of our invention is to provide a method for preparing partially de-etherified cellulose cyanoethyl ethers in which the reaction proceeds uniformly and smoothly without any degrading action upon the cellulose unit of the cellulose derivative. Further objects of our invention will appear herein.

We have found that partially de-etherified cellulose cyanoethyl ethers of good quality can be obtained by treating cyanoethyl cellulose having a substantial cyanoethyl content while in solution with aqueous sodium hydroxide for a time, particularly while the solvent conditions in a system are maintained at approximately maximum solubility during the course of the de-etherification operation. The thus-treated products have considerably greater water susceptibility than cyanoethyl cellulose increasing with an increase of time of treatment until, if desired, a completely water-soluble material may be obtained.

Cyanoethyl cellulose presents three points at which hydrolysis may occur: (1) the nitrile group can be hydrolyzed to the carboxyl grouping, (2) the cellulose chain can be degraded by hydrolyzing, and (3) the cyanoethyl group can be split off. We have found that the hydrolysis process in accordance with our invention is substantially confined to the last possibility, namely, that the cyanoethyl group is split off and that the final product obtained contains less nitrile than that contained in any of the products which are obtained during the de-etherification process.

The cyanoethyl celluloses which are employed as the starting material in processes in accordance with our invention are those which are soluble in organic solvents, particularly those having at least 2.5 cyanoethyl groups per glucose unit of the cellulose. These cellulose derivatives can be conveniently prepared by the method described in U. S. Patent 2,375,847 of Houtz using a large proportion of acrylonitrile to drive the reaction near to the tricyanoethyl stage. The product thus obtained or an equivalent compound is de-etherified by dissolving in a solvent such as acetone-water and adding to it an alkaline catalyst, such as sodium hydroxide.

The solvent which is employed should be one which is readily miscible with water and which will dissolve the cellulose cyanoethyl ethers, particularly when mixed with water, the solubility of these ethers as related to water content depending upon the degree of de-etherification which has been imparted thereto. For instance, if the cellulose cyanoethyl ether employed as the starting material contains 2.5–3 cyanoethyl groups per glucose unit thereof, any of the following solvents would be suitable for use: acetone, acetone-water, dioxane-water, ethylene glycol monomethyl ether, methyl ethyl ketone, pyridine, ethylene formal, or cyclo hexanone. All of the solvents are infinitely miscible with water except methyl ethyl ketone and cyclo hexanone. However, the miscibility of these two solvents with water is sufficiently pronounced that in most every case those solvents would be satisfactory for use. If the purity of the solvent used is not that desired because of coloration, it is often desirable to use as the solvent a freshly distilled material or to carry out the de-etherification in an inert atmosphere to avoid any oxidizing action thereon.

The de-etherification process in accordance with our invention is carried out by mixing with continuous stirring the cellulose cyanoethyl ether to be de-etherified in solution in an aqueous solvent containing sodium hydroxide. No external heating is necessary, the reaction supplying any heat which is necessary to promote the reaction. It is desirable in carrying out the de-etherification that the solvent employed contain the proportion of water which will give the maximum solubility for the cyanoethyl cellulose at the period of de-etherification which is involved. In order to carry out the reaction in this manner it is desirable to run tests periodically to determine the proportion of water which is desirable at that point and add water so as to bring the composition to the determined proportion. The intervals between tests are governed by the rate at which the reaction is proceeding.

For instance, with a de-etherification process proceeding at a slow rate tests may be run only twice a day and the solvent composition adjusted by the addition of water to give the maximum solubility for the cellulose derivative then present. If, on the other hand, the reaction is run at a more rapid rate, the making of tests more frequently and adjusting of the composition of the mass in accordance with those tests may be most desirable. After the de-etherification has proceeded to the desired point, the partially de-etherified cellulose cyanoethyl ether is precipitated and washed, either in water or methyl alcohol, depending upon the amount of de-etherification which has occurred. The product is then centrifuged and dried, such as at 160° F. for twenty-four hours. Treatment with hydrochloric acid, precipitation, and washing removes the sodium salts. The dried products may be employed for various purposes depending on the types of solubility which they exhibit. For instance, the products soluble in about equal parts of acetone and water may be employed for subbing operations on photographic film base. The products which have been etherified to a point that they are water soluble may be employed as the vehicle for silver halide in making photographic emulsions. Due to the fact that the hydrolysis has been accomplished without any appreciable hydrolysis of the nitrile group, the resulting product has very little, if any, carboxyl content.

The de-etherification of cyanoethyl cellulose may be carried out in the following manner:

180 parts of cyanoethyl cellulose having a 12.9% nitrogen content were dissolved at room temperature in a mixture of 550 parts of acetone and 60 parts of distilled water. 6.1 parts of sodium hydroxide were dissolved in 75 parts of distilled water, and this solution was added to the mass. After the sodium hydroxide had been added, tests were run and portions of distilled water were added to give maximum solubility as indicated by those tests. A total of 500 parts of distilled water was added in this manner in seven different additions. Samples were taken at each point of addition which were precipitated, washed in water or methyl alcohol, and analyzed. The times of hydrolysis, the analyses of the various products, and the solubilities of those products are as shown in the following table. Of the samples A was the only one precipitated and washed in water, the remaining samples being obtained by precipitation and washing in methyl alcohol.

|  | Cyanoethyl Ether | A | B | C | D | E | F | G |
|---|---|---|---|---|---|---|---|---|
| Time of Hydrolysis (Hrs.) | 0 | 7 | 25 | 34 | 47 | 55 | 78 | 220 |
| Analyses: | | | | | | | | |
| Per Cent Nitrogen | 12.9 | 11.1 | 9.4 | 8.3 | 7.5 | 7.5 | 7.0 | 5.3 |
| Per Cent Carboxyl | — | 0.15 | 0.49 | 0.26 | 0.28 | 0.35 | 0.40 | — |
| $C_2H_4CN/C_6$ | 2.9 | 2.2 | 1.6 | 1.4 | 1.2 | 1.2 | 1.1 | 0.8 |
| $COOH/C_6$ | — | 0.01 | 0.02 | 0.01 | 0.01 | 0.02 | 0.02 | — |
| Solvents: | | | | | | | | |
| Water | — | — | — | — | — | — | — | + |
| Acetone | + | — | — | — | — | — | — | — |
| Acetone-water (2:1) | — | + | + | + | + | + | + | — |
| Acetone-water (1:2) | — | — | — | + | + | + | + | + |
| Ethyl alcohol | — | — | — | — | — | — | — | — |
| Ethyl alcohol-water (2:1) | — | — | — | — | — | — | — | — |
| Ethyl alcohol-water (1:2) | — | — | — | — | + | + | + | + |
| Acetic acid | — | — | — | — | — | — | — | — |
| Acetic acid-water (2:1) | — | + | + | + | + | + | + | + |
| Acetic acid-water (1:2) | — | — | + | + | + | + | + | + |

+ Positive solubility at room temperature.
− Insoluble at room temperature.

We claim:

1. A method of preparing partially de-etherified cellulose cyanoethyl ethers which comprises treating a cellulose cyanoethyl ether having at least 2.5 cyanoethyl groups per glucose unit dissolved in a water-miscible solvent therefor with aqueous sodium hydroxide in an amount and concentration that the alkali is approximately 0.5% strength and the aggregate water is approximately 3½ times the weight of the cellulose cyanoethyl ether, whereby part of the cyanoethyl groups of the cellulose compound are replaced by hydroxyl groups.

2. A method of preparing partially de-etherified cellulose cyanoethyl ethers which comprises treating a cellulose cyanoethyl ether having at least 2.5 cyanoethyl groups per glucose unit dissolved in acetone-water with aqueous sodium hydroxide in an amount and concentration that the alkali is approximately 0.5% strength and the aggregate water is approximately 3½ times the weight of the cellulose cyanoethyl ether, whereby part of the cyanoethyl groups of the cellulose compound are replaced by hydroxyl groups.

3. A method of preparing partially de-etherified cellulose cyanoethyl ethers which comprises treating a cellulose cyanoethyl ether having at least 2.5 cyanoethyl groups per glucose unit dissolved in dioxane-water with aqueous sodium hydroxide in an amount and concentration that the alkali is approximately 0.5% strength and the aggregate water is approximately 3½ times the weight of the cellulose cyanoethyl ether, whereby part of the cyanoethyl groups of the cellulose compound are replaced by hydroxyl groups.

4. A method of preparing partially de-etherified cellulose cyanoethyl ethers which comprises treating a cellulose cyanoethyl ether having at least 2.5 cyanoethyl groups per glucose unit dissolved in ethylene glycol monomethyl ether with aqueous sodium hydroxide in an amount and concentration that the alkali is approximately 0.5% strength and the aggregate water is approximately 3½ times the weight of the cellulose cyanoethyl ether, whereby part of the cyanoethyl groups of the cellulose compound are replaced by hydroxyl groups.

KENNETH T. BARKEY.
JOHN W. MENCH.

REFERENCES CITED

The following references are of record in the file of this patent:

UNITED STATES PATENTS

| Number | Name | Date |
|---|---|---|
| 2,332,048 | Bock et al. | Oct. 19, 1943 |
| 2,332,049 | Bock et al. | Oct. 19, 1943 |
| 2,375,847 | Houtz | May 15, 1945 |